(12) United States Patent
Osmer et al.

(10) Patent No.: US 6,244,116 B1
(45) Date of Patent: Jun. 12, 2001

(54) AUTOMOBILE SEAT WEIGHT SENSOR

(75) Inventors: William Osmer, St. Joseph; Gary L. Buss; Patrick B. Blakesley, both of Elkhart, all of IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/374,874

(22) Filed: Aug. 16, 1999

(51) Int. Cl.⁷ .................................................. G01L 1/22
(52) U.S. Cl. ...................................... 73/862.474; 177/136
(58) Field of Search ................ 73/862.381, 862.391, 73/862.451, 862.474, 862.627; 177/136

(56) References Cited

U.S. PATENT DOCUMENTS

| | | | |
|---|---|---|---|
| 4,556,598 | 12/1985 | Bloom . | |
| 5,109,199 | * 4/1992 | Berger | 324/415 |
| 5,573,269 | 11/1996 | Gentry . | |
| 5,986,221 | * 11/1999 | Stanley | 177/136 |
| 6,092,838 | * 7/2000 | Wallker | 73/862.627 |
| 6,109,117 | * 8/2000 | Stanley et al. | 73/862.325 |
| 6,161,891 | * 12/2000 | Blakesley | 296/65.01 |

\* cited by examiner

*Primary Examiner*—Max Noori
(74) *Attorney, Agent, or Firm*—Mark P. Bourgeois; Mark W. Borgman

(57) ABSTRACT

A vehicle seat weight sensor for sensing the weight of an occupant in a vehicle seat. The sensor has a housing. A substrate is located in the housing and has a first and second end. Strain gauge resistors are located on the substrate to generate an electrical signal in response to the substrate being stressed by the occupants weight. The electrical signal is changes as a function of the weight of the seat occupant. A connection mechanism is located at the first and second ends of the substrate to connect the substrate to the vehicle seat.

18 Claims, 7 Drawing Sheets

AUTOMOBILE SEAT WEIGHT SENSOR

BACKGROUND OF THE INVENTION

1. Field of the Invention

This invention relates to an automobile weight sensor for detecting the presence of a person having a weight in a car seat, and in particular to a sensor that can detect the presence of an occupant using strain sensitive resistors and provide an electrical signal to control activation of an airbag.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all. A current unmet need exists for a reliable, low cost, simple and robust automobile seat weight sensor that is used to control airbag deployment.

3. Related Art

Examples of patents that are related to the present invention are as follows, and each patent is herein incorporated by reference for the supporting teachings:

U.S. Pat. No. 5,573,269 is a apparatus for sensing and restraining an occupant of a vehicle seat.

U.S. Pat. No. 4,556,598 is a porcelain tape for producing porcelainized metal substrates.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicants claimed invention.

SUMMARY OF THE INVENTION

It is a feature of the invention to provide a reliable and cost-effective vehicle seat weight sensor for detecting the weight of a seat occupant. The sensor uses strain gauge resistors.

An additional feature of the invention is to provide a vehicle seat weight sensor for sensing the weight of an occupant in a vehicle seat. The sensor includes a housing. The housing has a connector shroud. A substrate is located in the housing and has a first and second end. A strain gauge resistor is located on the substrate to generate an electrical signal in response to the substrate being stressed. The electrical signal changes as a function of the weight of the seat occupant. A connection mechanism is located at the first and second ends of the substrate to connect the substrate to the vehicle seat.

Another feature of the invention is to provide a method for controlling deployment of an air bag. The method includes providing a seat weight sensor that is connected between a seat spring and a seat basket of the vehicle seat. An occupant is seated into the seat. An electrical signal changes as a function of the weight of the seat occupant. The electrical signal is provided to an airbag controller. The deployment of the airbag is controlled in response to the electrical signal.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
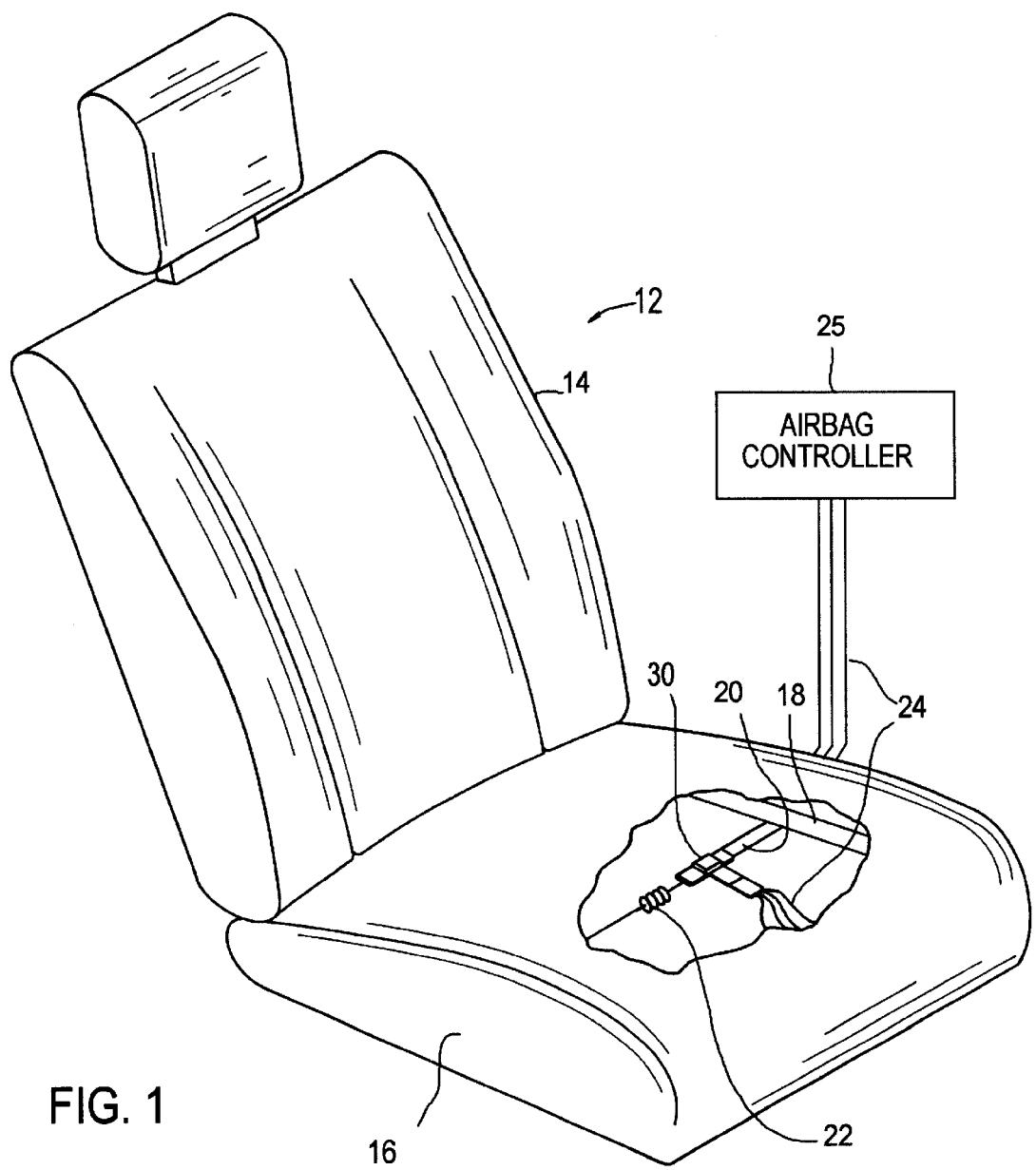
FIG. 1 is a perspective view of the preferred embodiment of an automobile seat weight sensor in an automobile seat.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENT

The present invention provides a vehicle weight sensor for detecting the weight of a seat occupant. Referring to FIG.

1, there is a seat assembly 12 shown. Seat assembly 12 has a seat back 14, seat bottom 16, side rail 18, seat basket 20, seat spring 22 and a connector or wire harness 24. Weight sensor assembly 30 is shown mounted in the seat between spring 22 and seat basket 20. When an occupant sits on seat bottom 16, the occupants weight causes the tension force in spring 22 to increase. This force is measured by sensor 30 and an electrical signal output is generated and transmitted over wire harness 24 to a conventional air bag controller. The air bag controller then can control deployment of the airbag based upon the occupants weight.

Figure 2:
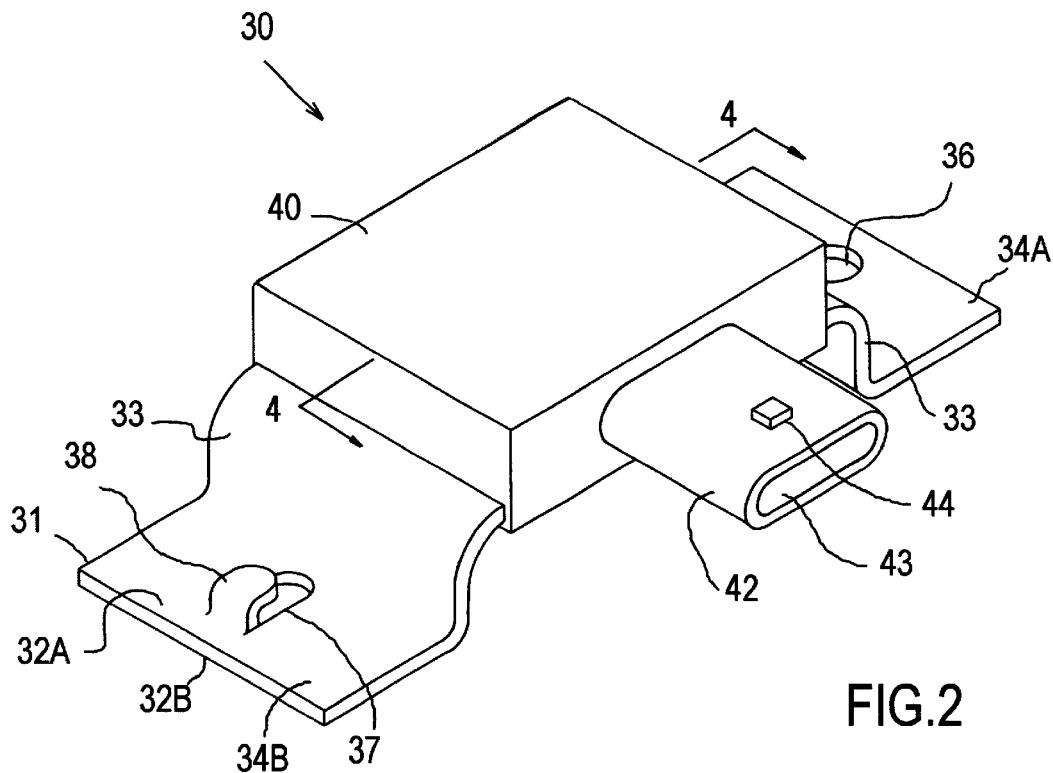
FIG. 2 is a perspective view of the automobile seat weight sensor of FIG. 1.
Figure 3:
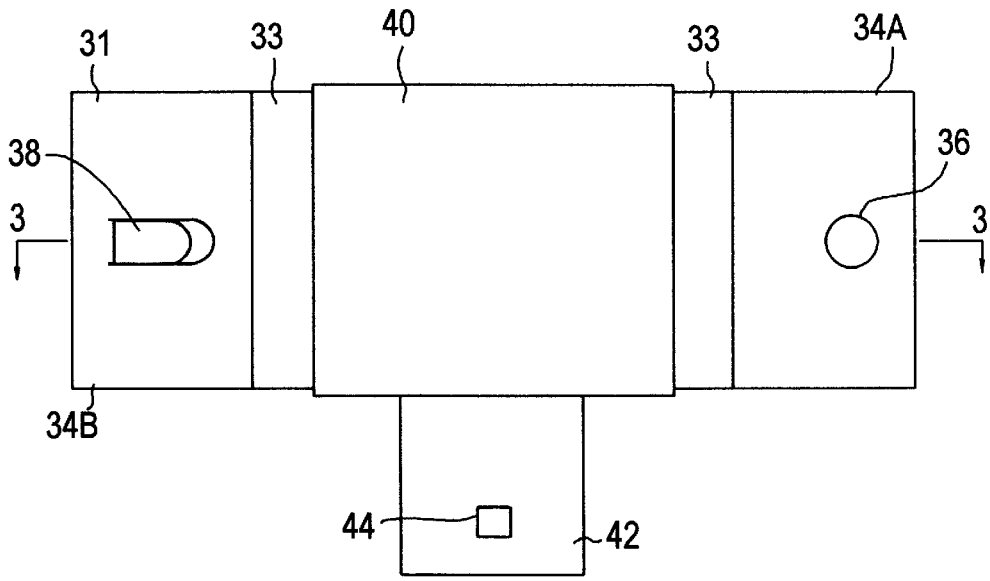
FIG. 3 is a top view of FIG. 2.
Figure 4:
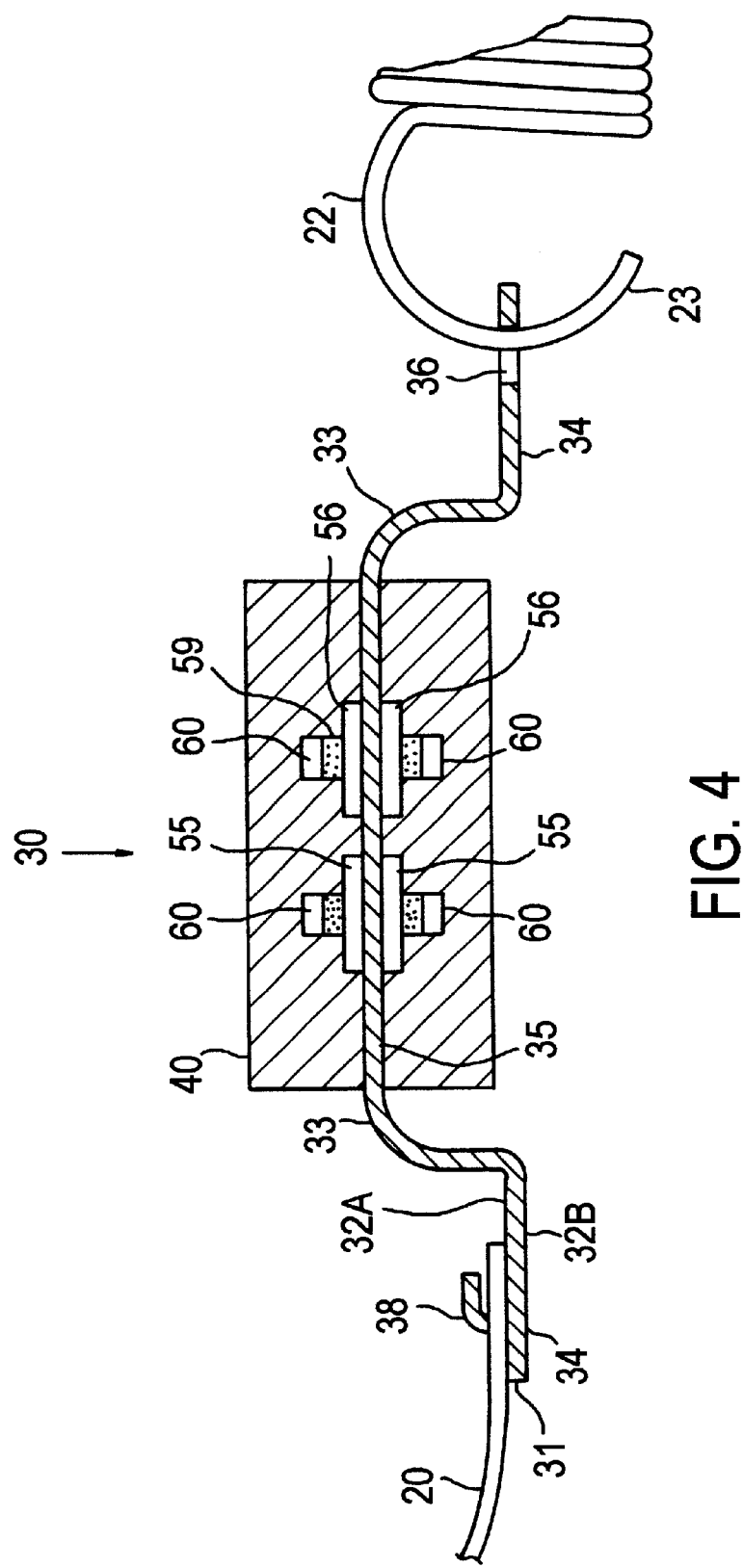
FIG. 4 is a cross-sectional view of FIG. 2 when the sensor is attached to a seat.

Referring to FIGS. 2, 3, and 4 details of sensor assembly 30 are shown. Sensor assembly 30 has a metal substrate 31 with an upper surface 32A and a bottom surface 32B. Metal substrate 31 is preferably formed from steel. Substrate 31 has step sections 33 that extends downwardly on both sides of a center section 35. A pair of outer flat sections 34A and 34B connect with and extend away from step sections 33. A spring aperture 36 is located in section 34A and has spring end 23 of seat spring 22 passing therethrough. A hook aperture 37 and hook 38 are formed in section 34B. Seat basket 20 attaches over hook 38 to connect sensor 30 to seat assembly 10. Step sections 33, apertures 36 and 37 and hook 38 are formed by stamping substrate 31. Housing 40 is insert molded using plastic injection molding around metal substrate 31. Housing 40 has a connector shroud 42, a connector cavity 43 and a latch tab 44. Wire harness 24 connects onto connector shroud 42 and locks in place with latch tab 44. Inside housing 40, on center section 35 on surfaces 32A and 32B, conductors 56 are located. Terminals 60 are electrically and mechanically attached to conductors 56 using a conventional solder 59. Terminals 60 extend into housing cavity 43, where they mate with the wiring harness 24.

Figure 5:
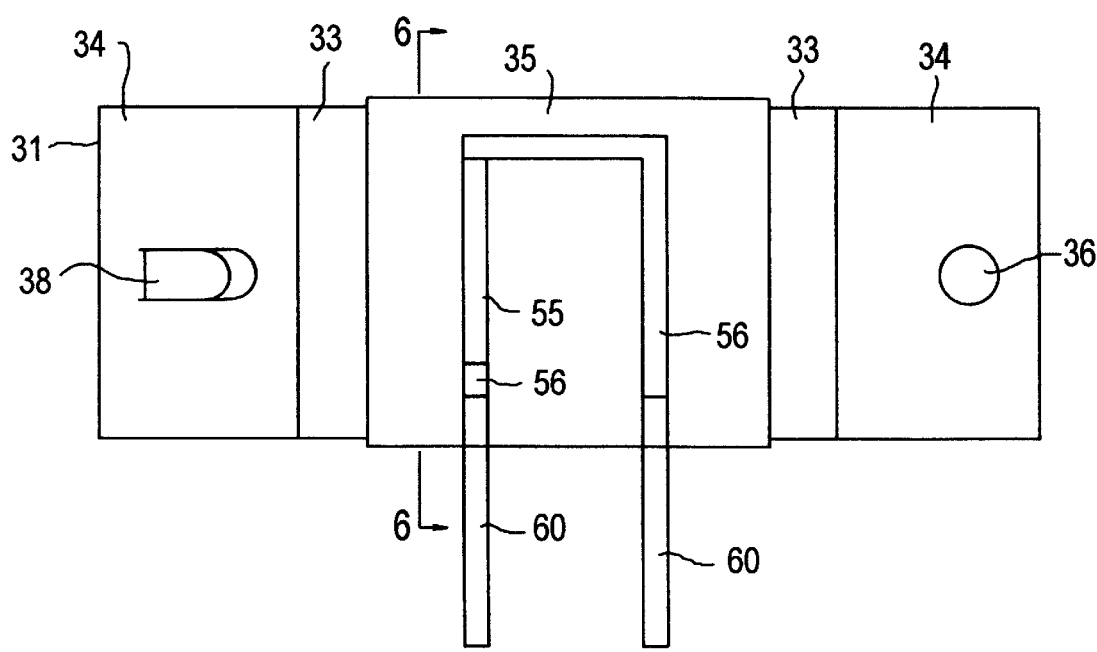
FIG. 5 is a top view of FIG. 2 with the housing removed.
Figure 6:
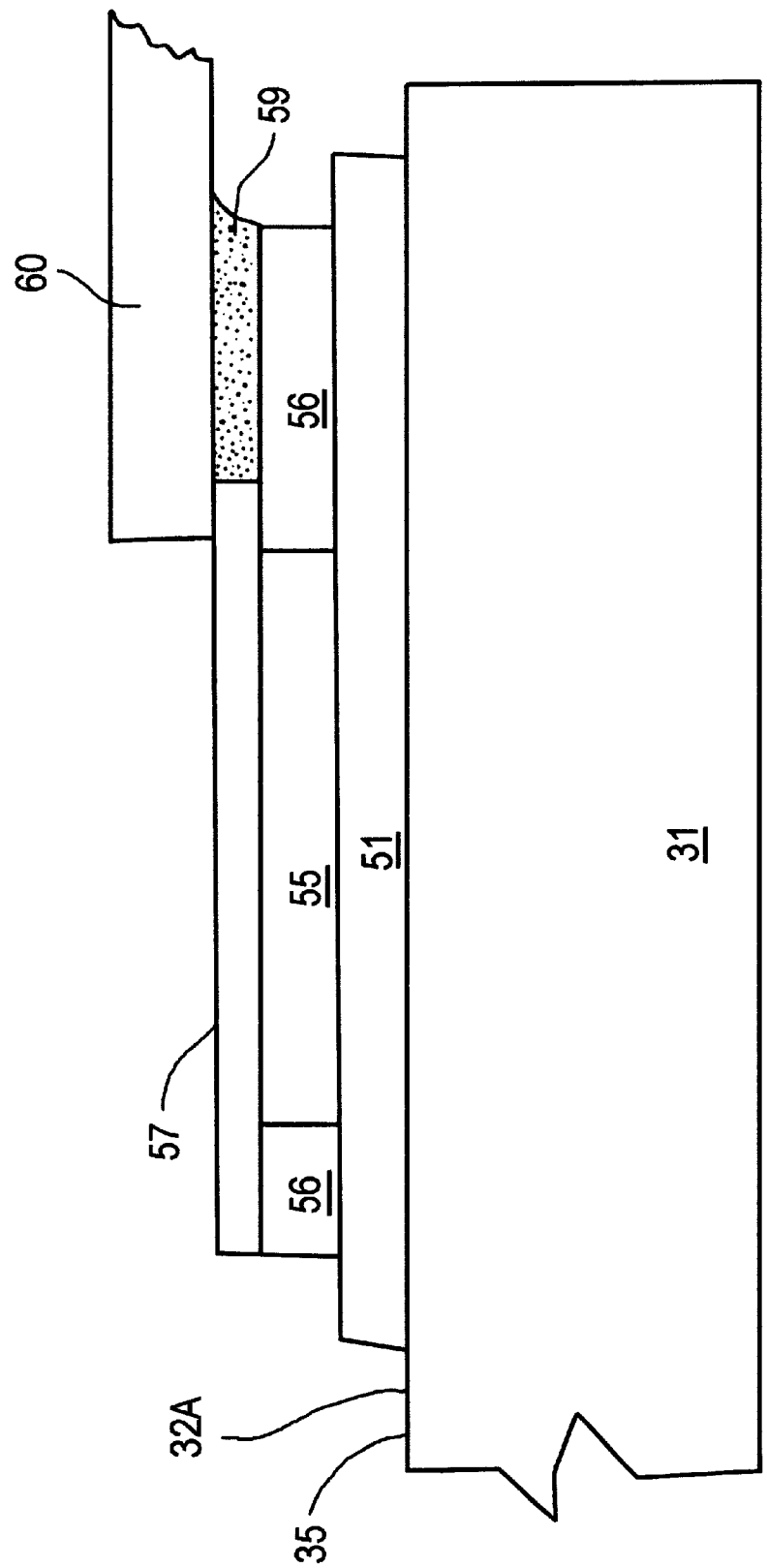
FIG. 6 is an enlarged side view of FIG. 5 along lines 6—6.

Referring to FIGS. 5 and 6, details of the sensor inside the housing are shown. FIG. 5 is a top view with the housing removed and FIG. 6 is an enlarged side view of FIG. 5 along lines 6—6. A dielectric 51 layer is shown disposed on top surface 32A in center section 35. Similarly, layer 51 would be disposed on bottom surface 32B. On top of dielectric layer 51, a strain gauge resistor 55 is formed. Resistors 55 are strain sensitive and will change resistance based on the amount of flex or bend in substrate 31. Conductors 56 connect to resistors 55. A cover coat 57 is placed over resistors 55 and conductors 56. The cover coat protects the resistors from damage and acts as a solder mask. Terminals 60 are soldered to conductors 56 using a solder 59. Dielectric 51, Resistors 55, and conductors 56 are formed from conventional thick film materials using conventional thick film processing techniques or from a ceramic green tape. Such methods of forming resistors on metal substrates are detailed in U.S. Pat. No. 4,556,598 titled, "a porcelain tape for producing porcelainized metal substrates", the contents of which are specifically herein incorporated by reference In a typical configuration, two resistors 55 would be placed on top surface 32A and two resistors 55 would be placed on bottom surface 32B to form a bridge circuit (not shown) that is well known in the art. Alternatively, the resistors could be placed only on the top or the bottom surface.

Figure 7:
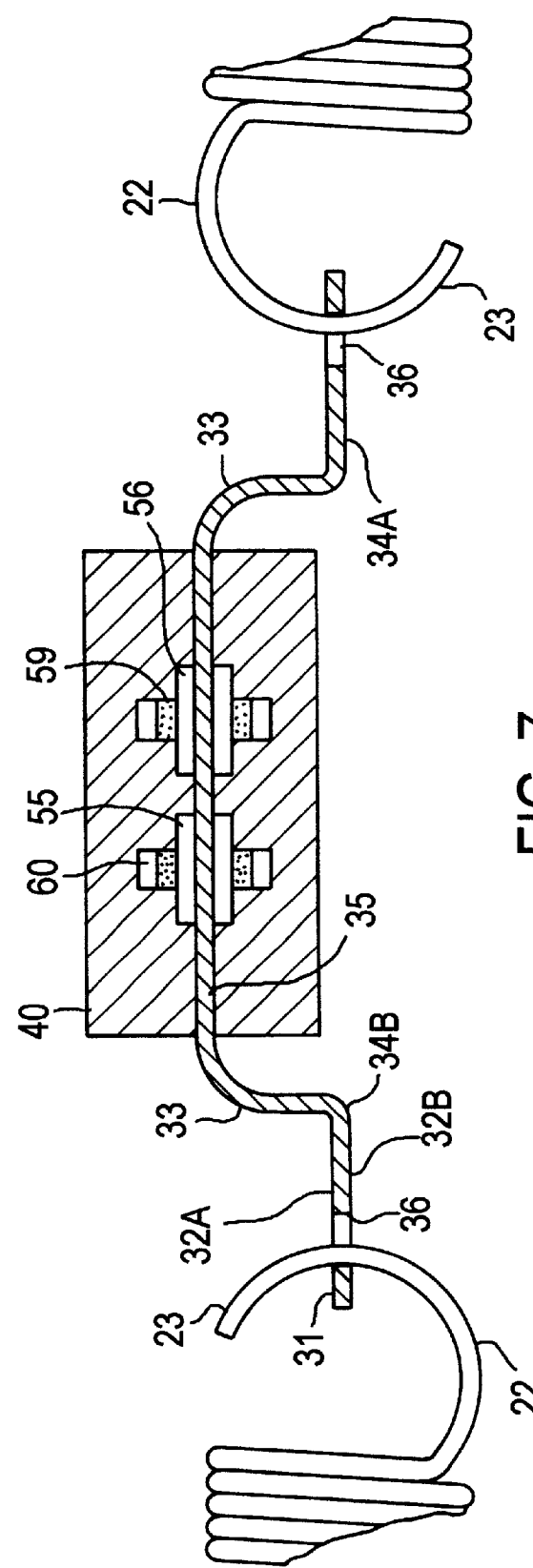
FIG. 7 is a cross-sectional view of an alternative embodiment.

Referring to FIG. 7, an alternative embodiment is shown. If desired, the seat sensor 30 may be connected between two seat springs 22, omitting the seat basket 20 connection. In this case, the hook 38 is eliminated and another aperture 36 is formed in section 34B.

Figure 8:
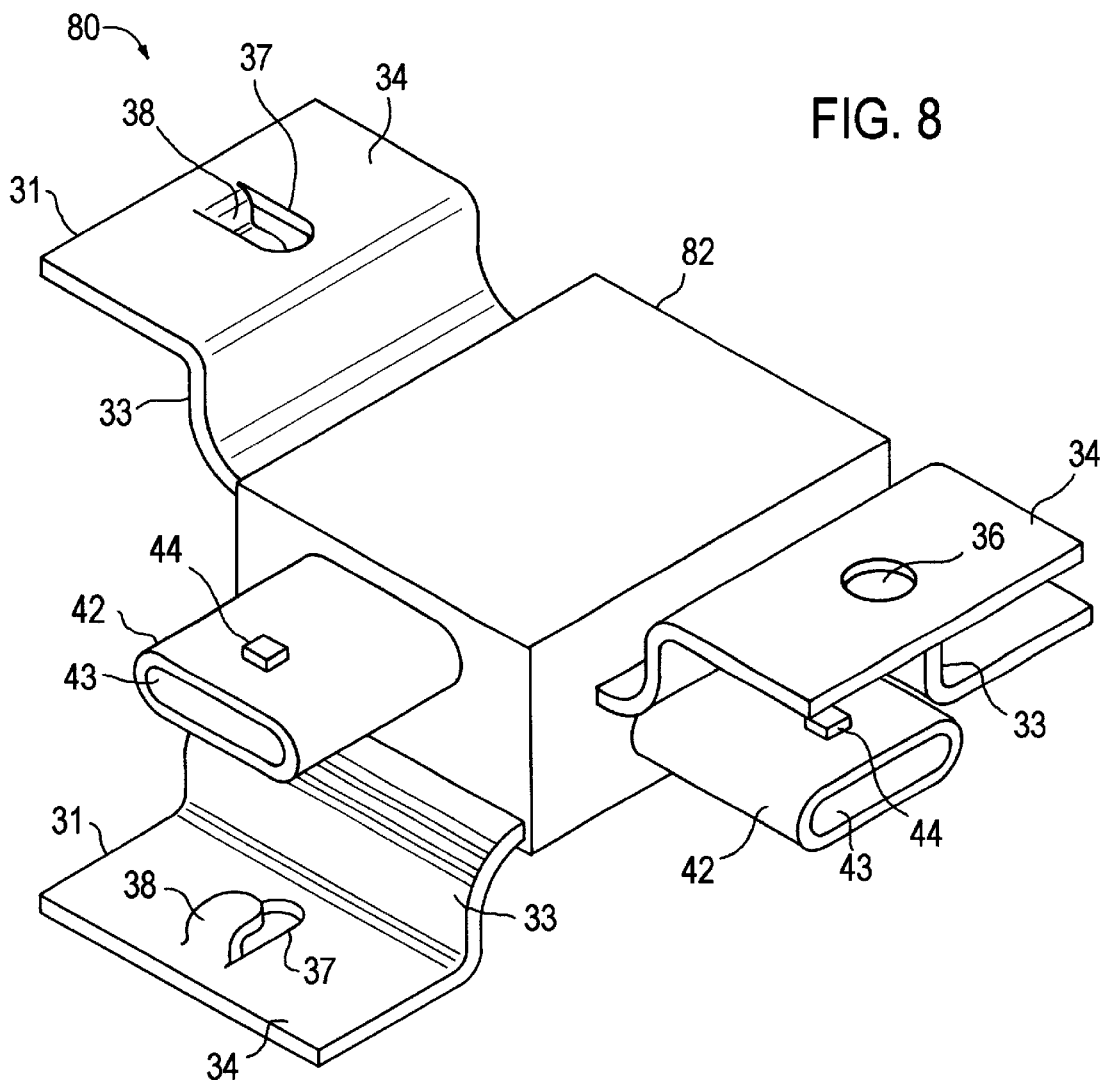
FIG. 8 is a perspective view of an alternative embodiment.

Referring to FIG. 8, another alternative embodiment is shown. In some applications, it may be desired, to sense tension on the seat springs in two directions. Sensor assembly 80 pairs together two of sensor assembly 30 in a common housing 82 to give electrical output signals representative of seat tension in two directions. Sensor assembly 80 can be mounted in the center of a seat or can be mounted in a corner of the seat. Housing 82 is insert molded using plastic injection molding around two metal substrates 31.

Remarks About the Preferred Embodiment

When an occupant sits in a vehicle seat, weight is transferred to substrate 31 as a force through seat spring 22 and seat basket 20. Step sections 33 cause the center section 35 of substrate 31 to bend. As the center section 35 bends, the resistors on the top surface will be in compression and the resistors on the bottom surface will be in tension. A voltage is applied to the resistors 55. The strain on resistors 55 causes the voltage or electrical output signal across resistors 55 to change as a function of the weight of the seat occupant. The electrical signal is transmitted over wire harness 24 to a conventional air bag controller. The air bag controller then can control deployment of the airbag based upon the occupants weight. Typically, the air bag is disengaged or turned off below a minimum weight. The air bag deploys with less force for a lighter person and more force for a heavier person.

Variations of the Preferred Embodiment

Although the illustrated embodiment shows a resistor 55 on the top and bottom surface of substrate 31, more or fewer resistors could be used. If desired, resistors 55 could be placed on only one surface of substrate 31.

The weight sensor shown used a thick film resistor, one skilled in the art will realize that the preferred embodiment would work with other types of resistors. For example, discrete chip resistors could be attached to substrate 31 or thin film resistors could be used. Furthermore, the shape of substrate 31 could be varied to any configuration that would transfer the weight from the seat and concentrate it in the desired location on the substrate.

Although sensor assembly 30 was shown with a housing 40, it is contemplated to omit housing 40.

Another variation of the weight sensor would be to utilize other electrical connections other than terminals 60. For example, other types of connectors or discrete wires could be used in place of terminals 60.

Yet, a further variation, would be to place signal conditioning circuitry on substrate 31 to amplify and filter the electrical signal before it is transmitted to the airbag controller.

The illustrated embodiment showed the use of the weight sensor in an automobile seat. It is contemplated to utilize the weight sensor in other occupant weight sensing applications such as chairs, sofas, scales, beds and mattresses, hospital equipment, cribs, airplane seats, train seats, boat seats, amusement rides, and theater seats, While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle seat weight sensor for sensing the weight of an occupant in a vehicle seat, comprising:

a) a housing having a connector shroud for receiving a connector therein;

b) a first substrate, extending through the housing and having a first and second end;

c) a second substrate, extending through the housing and having a third and fourth end, the second substrate oriented at substantially right angles to the first substrate;

c) a plurality of strain gauge resistors, located on each of the substrates, for generating an electrical signal in response to the substrate being stressed, the electrical signal changing as a function of the weight of the seat occupant; and d) connection means, located at the first, second, third and fourth ends of the substrate, for connecting the substrate to the vehicle seat.

2. The vehicle seat weight sensor according to claim 1, wherein the connection means are apertures extending through the substrate at the first, second, third and fourth ends.

3. The vehicle seat weight sensor according to claim 2, wherein the apertures each have a seat spring connected therein.

4. The vehicle seat weight sensor according to claim 1, wherein the connection means are an aperture extending through the substrate at the first and third ends and a hook located at the second and fourth ends.

5. The vehicle seat weight sensor according to claim 4, wherein the apertures have a seat spring connected therein and the hooks are connected to a seat basket.

6. The vehicle seat weight sensor according to claim 1, further comprising a plurality of terminals contained within the connector shroud and connected to the resistors.

7. The vehicle seat weight sensor according to claim 1, wherein the substrate is a porcelainized metal.

8. A vehicle seat weight sensor for sensing the weight of an occupant in a vehicle seat, comprising:

a) a housing;

b) a first substrate, extending through the housing and having a first and second end;

c) a second substrate, extending through the housing and having a third and fourth end, the second substrate oriented at substantially right angles to the first substrate;

c) a strain gauge resistor, located on each of the substrates, for generating an electrical signal in response to the substrate being stressed, the electrical signal proportional to the weight of the seat occupant;

d) two connection apertures, located at the first and third ends of the substrates, for connecting the substrate to seat springs in the vehicle seat; and e) two hooks, located at the second and fourth ends of the substrates, for connecting the substrate to a seat basket in the vehicle seat.

9. The vehicle seat weight sensor according to claim 8, wherein the substrate is a metal coated with a dielectric layer, the strain gauge resistors disposed on top of the dielectric layer.

10. The vehicle seat weight sensor according to claim 8, wherein the electrical signal is used to control activation of an airbag.

11. A vehicle seat weight sensor for sensing the weight of an occupant in a vehicle seat, the sensor attached to a seat spring, comprising:

a) a housing having a connector shroud for receiving a connector therein;

b) a substrate, located in the housing and having a center section, a pair of step sections attached to the center section, the center section located between the step sections and a pair of outer sections attached to the step sections;

c) at least one strain gauge resistor, mounted on the center section, for generating an electrical signal in response to the substrate being stressed, the electrical signal changing as a function of the weight of the seat occupant;

d) at least one terminal mounted in the connector shroud and electrically connected to the resistor; and e) a spring aperture located in each of the outer sections, the spring aperture adapted to be attached to the seat spring.

12. The vehicle seat weight sensor according to claim 11, wherein the substrate is a porcelainized metal.

13. The vehicle seat weight sensor according to claim 11, wherein the substrate is a metal coated with a dielectric layer.

14. A vehicle seat weight sensor for sensing the weight of an occupant in a vehicle seat, comprising:

a) a housing having a connector shroud extending therefrom;

b) a substrate, extending through the housing and having a center section, a pair of step sections attached to the center section, the center section located between the step sections and a pair of outer sections attached to the step sections, the housing encasing the center section, the step sections and the outer sections extending outwardly from the housing;

c) a strain gauge resistor, located on the center section, for generating an electrical signal in response to the substrate being stressed, the electrical signal proportional to the weight of the seat occupant, the step portions concentrating the stress on to the resistor;

d) a connection aperture, located in one of the outer sections, for connecting the substrate to a seat spring in the vehicle seat; and e) a hook, located in the other outer section, for connecting the substrate to a seat basket in the vehicle seat.

15. The vehicle seat weight sensor according to claim 14, wherein the substrate is a metal coated with a dielectric layer, the strain gauge resistor disposed on top of the dielectric layer.

16. The vehicle seat weight sensor according to claim 14, wherein the electrical signal is used to control activation of an airbag.

17. A vehicle seat weight sensor comprising:

a) a generally planar substrate including:
1) a horizontally extending center section;
2) a pair of curved step sections attached to the center section, the center section located adjacent the step section and extending outwardly therefrom; and
3) a horizontally extending outer section attached to each of the step sections, the outer sections disposed parallel to the center section;

b) at least one strain gauge resistor, mounted on the center section of the substrate, for generating an electrical signal in response to the substrate being stressed, the curved step sections concentrating the stress onto the center section; and c) an electrical connector, attached to the resistor, for electrically connecting an external circuit to the resistor.

18. The vehicle seat weight sensor according to claim 17, wherein a housing is molded over the center section, the housing having a connector shroud extending therefrom, the electrical connector contained within the connector shroud.

* * * * *